US012374514B2

(12) United States Patent
Pan

(10) Patent No.: US 12,374,514 B2
(45) Date of Patent: Jul. 29, 2025

(54) KEYBOARD WITH BACKLIT CIRCUIT BOARD

(71) Applicant: Darfon Electronics Corp., Taoyuan (TW)

(72) Inventor: Yi-Jui Pan, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 18/884,489

(22) Filed: Sep. 13, 2024

(65) Prior Publication Data

US 2025/0095930 A1 Mar. 20, 2025

Related U.S. Application Data

(60) Provisional application No. 63/583,601, filed on Sep. 19, 2023.

(30) Foreign Application Priority Data

Sep. 12, 2024 (TW) ................................ 113209915

(51) Int. Cl.
*H01H 13/02* (2006.01)
*H01H 13/10* (2006.01)
*H01H 13/81* (2006.01)
*H01H 13/83* (2006.01)

(52) U.S. Cl.
CPC .......... *H01H 13/83* (2013.01); *H01H 13/023* (2013.01); *H01H 13/10* (2013.01); *H01H 13/81* (2013.01)

(58) Field of Classification Search
CPC ................. H01H 13/02; H01H 13/023; H01H 2013/026; H01H 13/10; H01H 3/12; H01H 3/125; H01H 2003/127; H01H 9/161
See application file for complete search history.

(56) References Cited

U.S. PATENT DOCUMENTS 4,772,769 A * 9/1988 Shumate ............... G06F 3/0202 200/317
6,765,503 B1 * 7/2004 Chan ................... H01H 13/702 362/85
6,860,612 B2 * 3/2005 Chiang ................ G02B 6/0068 362/23.05

(Continued)

*Primary Examiner* — Ismael Negron
(74) *Attorney, Agent, or Firm* — McClure, Qualey & Rodack, LLP

(57) ABSTRACT

A circuit board includes a substrate having a plurality of through-openings, a plurality of coupling members disposed on the substrate and configured to connect to a keycap, a switch circuit disposed on the substrate and having switch pads for triggering a keyswitch signal in response to the keycap moving toward the substrate, a lighting circuit disposed on the substrate at a side opposite to the coupling members, and an illuminant electrically connected to the lighting circuit. The switch pads and illuminant arranged such that their vertical projections fall within an area surrounded by the plurality of coupling members. A keyboard includes the switch circuit, the lighting circuit, a light guide sheet, and at least one keycap, such that light from the illuminant enters the light guide and propagates transversely to illuminate the at least one keycap.

18 Claims, 7 Drawing Sheets

(56) References Cited

U.S. PATENT DOCUMENTS

| | | | | |
|---|---|---|---|---|
| 6,918,677 | B2 * | 7/2005 | Shipman | H01H 13/70 362/555 |
| 7,525,056 | B2 * | 4/2009 | Chiba | H01H 13/83 200/314 |
| 8,168,903 | B2 * | 5/2012 | Chen | H01H 13/83 200/310 |
| 8,530,768 | B2 * | 9/2013 | Hwa | H01H 13/83 362/616 |
| 12,087,517 | B2 * | 9/2024 | Tsai | H01H 13/83 |
| 12,315,686 | B2 * | 5/2025 | Huang | H01H 13/83 |
| 2011/0247925 | A1 * | 10/2011 | Lin | H01H 13/83 200/314 |
| 2024/0096567 | A1 * | 3/2024 | Chen | H01H 13/83 |
| 2024/0379303 | A1 * | 11/2024 | Chen | H01H 13/83 |
| 2025/0093569 | A1 * | 3/2025 | Pan | H01H 13/83 |

* cited by examiner

KEYBOARD WITH BACKLIT CIRCUIT BOARD

CROSS-REFERENCE TO RELATED APPLICATION

This application claims the priority benefits of Taiwan patent application serial No. 113209915, filed on Sep. 12, 2024, and also claims the priority benefits of U.S. provisional application Ser. No. 63/583,601, filed Sep. 19, 2023. The entirety of the mentioned above patent applications is hereby incorporated by reference herein and made a part of this specification.

BACKGROUND OF THE INVENTION

1. Field of the Invention

The invention generally relates to a backlit circuit board. Particularly, the invention relates to a backlit circuit board having keyswitch coupling members, a switch circuit and a lighting circuit, and a backlit module, a backlit keyswitch and keyboard having the backlit circuit board.

2. Description of the Prior Art

Conventional backlit keyswitches and keyboards are usually manufactured by separately forming the keyswitch structure that generates a trigger signal and the backlit module that provides backlight, and then combining the keyswitch structure and the backlit module together. However, the conventional keyswitch structure and backlight module are respectively multi-layer stacked structures, so that the reduction in the overall thickness of the backlit keyswitch (or keyboard) is not easy, which is not conducive to the thinning of the device.

SUMMARY OF THE INVENTION

It is an object of the invention to provide a backlit circuit board, which not only can serve as the baseplate for the keyswitch structure, but also has a switch circuit and a lighting circuit to serve as the switch circuit board for the keyswitch structure and the light source circuit board for the backlit module.

It is another object of the invention to provide a backlit circuit board, which integrates the switch circuit of the keyswitch structure and the lighting circuit of the backlit module with the baseplate of the keyswitch structure to effectively reduce the overall thickness of the backlit keyswitch.

In an embodiment, the invention provides a backlit circuit board for supporting a keycap. The backlit circuit board includes a substrate having a plurality of openings penetrating through the substrate and a plurality of coupling members disposed on the substrate and configured to directly or indirectly connect the at least one keycap, a switch circuit disposed on the substrate and having switch pads for triggering a keyswitch signal in response to the keycap moving toward the substrate, a lighting circuit disposed on the substrate and located at a side opposite to the plurality of coupling members, and an illuminant electrically connected to the lighting circuit, wherein vertical projections of the switch pads and the illuminant fall within a range surrounded by the plurality of coupling members.

In an embodiment, the substrate is a non-metal plate, and an upper surface and a lower surface of the substrate are insulation surfaces.

In an embodiment, the substrate includes a metal plate and at least one insulation layer, and the at least one insulation layer at least partially covers an upper surface and a lower surface of the metal plate.

In an embodiment, the at least one insulation layer further covers an inner wall of at least one of the plurality of openings, a sidewall of the metal plate, and/or a surface of at least one of the plurality of coupling members.

In an embodiment, the vertical projection of the switch pads overlaps the illuminant.

In an embodiment, a vertical projection of the switch circuit at least partially overlaps the lighting circuit.

In an embodiment, the backlit circuit board further includes at least one protective layer disposed on the substrate to cover the switch circuit and/or the lighting circuit.

In an embodiment, the substrate has a plurality of ribs configured to define the plurality of openings; the at least one protective layer has a reflective surface and/or a microstructure; the microstructure overlaps at least one of the plurality of ribs of the substrate.

In an embodiment, the keycap has a light permeable region and a light impermeable region; the at least one protective layer has a reflective surface and/or a microstructure; the microstructure overlaps the light impermeable region of the keycap.

In an embodiment, the substrate has a plurality of ribs configured to define the plurality of openings; the switch circuit and the lighting circuit are disposed above and below at least one of the plurality of ribs, respectively.

In another embodiment, the invention provides a backlit module including the backlit circuit board described above and a light guide sheet, wherein light emitted from the illuminant enters the light guide sheet to propagate transversely to illuminate the keycap.

In an embodiment, the light guide sheet has a light hole; the illuminant is accommodated in the light hole.

In an embodiment, the backlit module further includes a glue layer disposed around the illuminant and located between the light guide sheet and the substrate, wherein a glue-free region is formed between the light hole and the glue layer.

In an embodiment, the backlit module further includes a reflective layer disposed at a side of the light guide sheet opposite to the substrate.

In an embodiment, the backlit module further includes a reflective layer disposed at a side of the light guide sheet opposite to the substrate, wherein the reflective layer has a microstructure located within a vertical projection of the light hole of the light guide sheet.

In an embodiment, the backlit module further includes a mask film disposed between the substrate and the light guide sheet, wherein the mask film has at least one light-permeable window corresponding to the keycap.

In an embodiment, the mask film has an illuminant hole; the light guide sheet has a light hole corresponding to the illuminant hole; the illuminant extends through the illuminant hole into the light hole.

In yet another embodiment, the invention provides a backlit keyswitch including the backlit circuit board described above and the keycap.

In a further embodiment, the invention provides a backlit keyboard including the backlit circuit board described above and the keycap.

Compared with the prior art, the backlit circuit board of the invention can function as the baseplate of the keyswitch structure and further has the switch circuit and the lighting circuit to function as the switch circuit board of the keyswitch structure and the light source circuit board of the backlit module at the same time. Moreover, the backlit circuit board of the invention integrates the switch circuit of the keyswitch structure and the lighting circuit of the backlit module with the baseplate of the keyswitch structure, so that the overall thickness of keyswitch can be effectively reduced to facilitate the thinning design.

DETAILED DESCRIPTION OF THE PREFERRED EMBODIMENT

Figure 1:
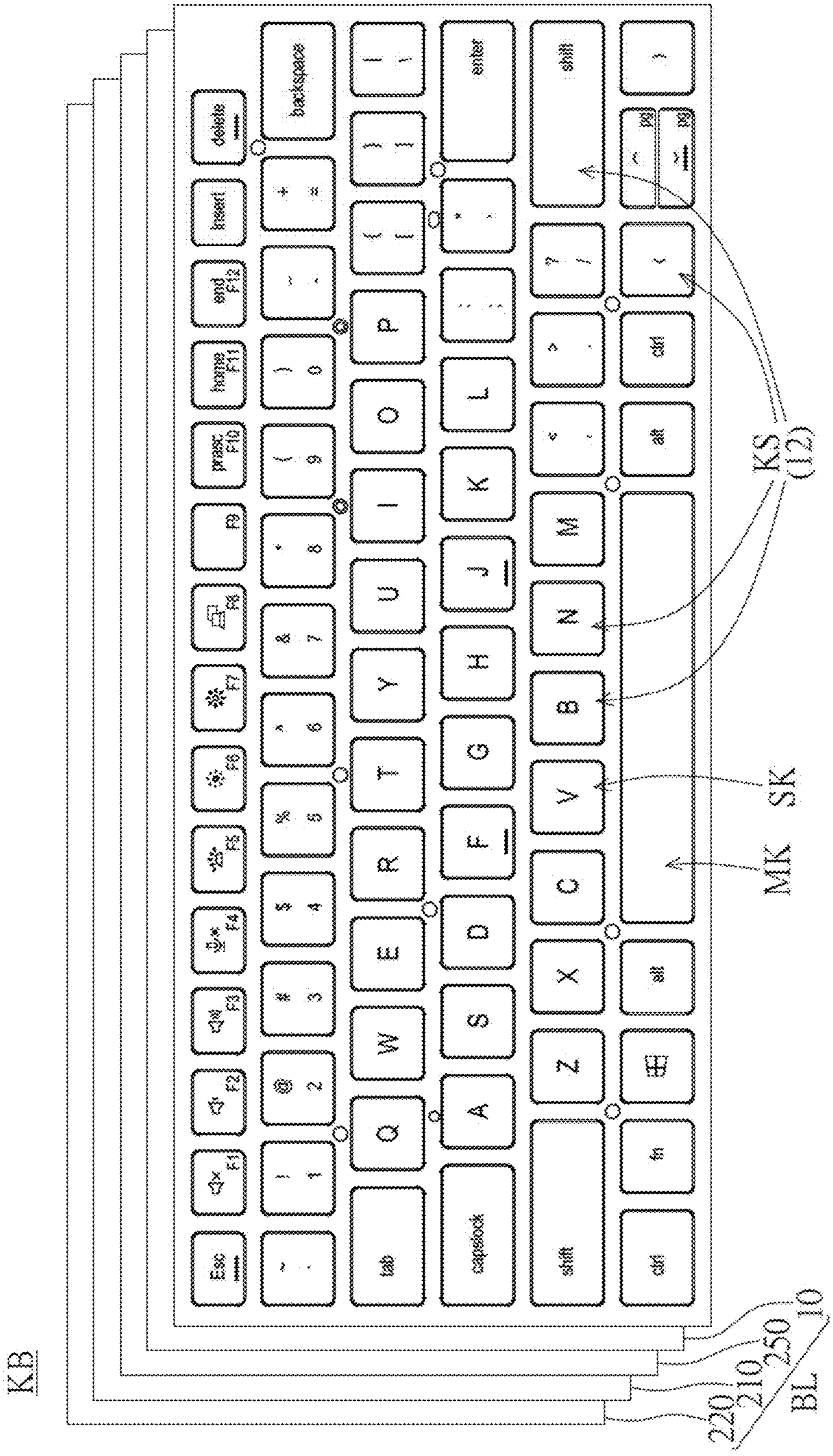
FIG. 1 is a schematic view of the backlit keyboard in an embodiment of the invention.
Figure 2:
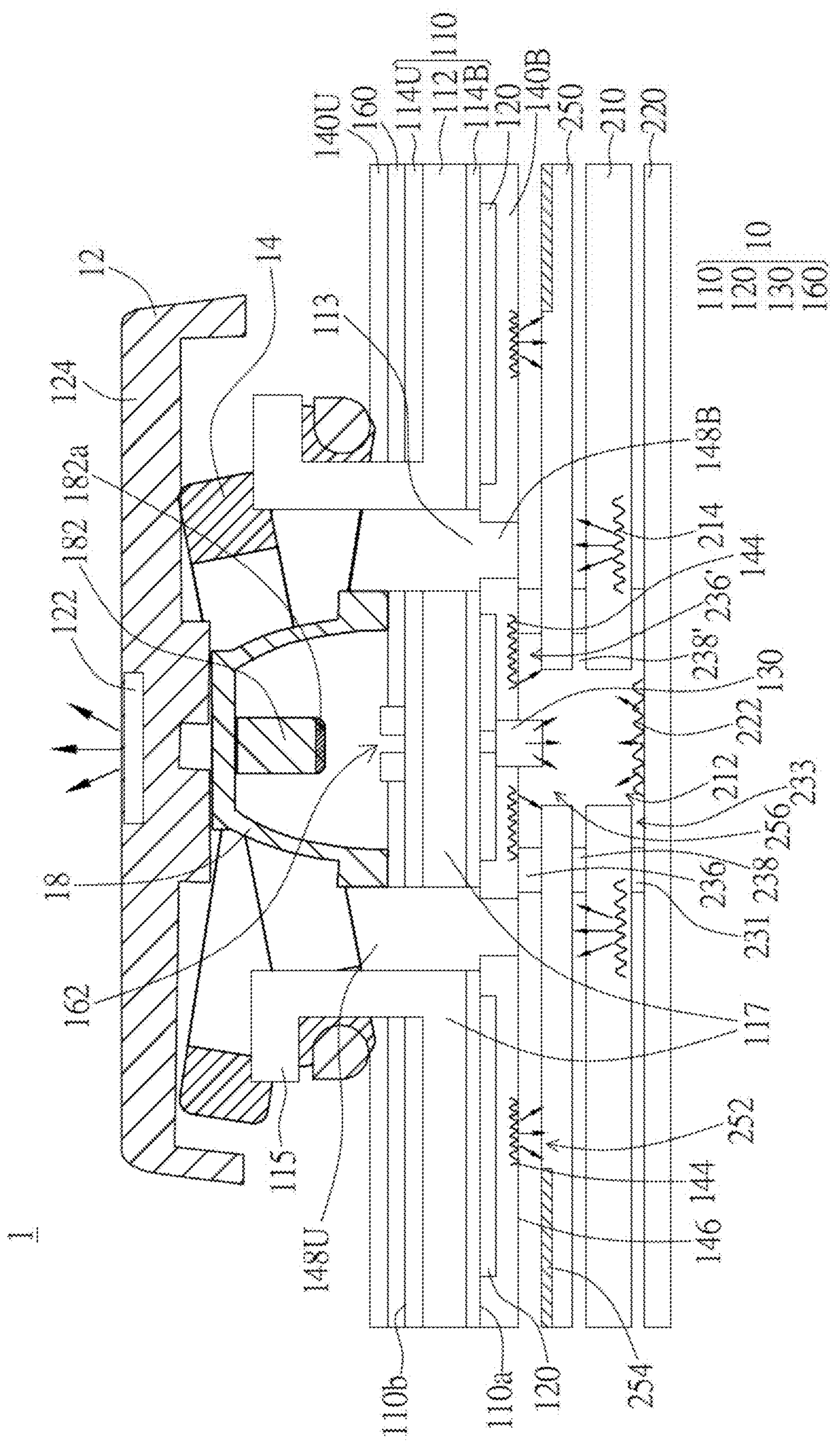
FIG. 2 is a schematic cross-sectional view of the backlit keyswitch in an embodiment of the invention.

The invention mainly involves the integration of the baseplate of the keyswitch, the switch circuit of the keyswitch and the lighting circuit of the backlit module to achieve the reduction in the overall thickness of keyswitch and to promote the ultimate luminous effect and the luminance uniformity of the backlit module for a single keyswitch or even the entire keyboard. Referring to FIG. 1 and FIG. 2, FIG. 1 is a schematic view of the backlit keyboard KB in an embodiment of the invention, and FIG. 2 is a schematic cross-sectional view of the backlit keyswitch 1 in an embodiment of the invention. In an embodiment, the backlit keyboard KB of the invention includes a plurality of keyswitches KS (such as square keyswitches SK or multiple keyswitches MK) and a backlit module BL. Each keyswitch KS (e.g. the backlit keyswitch 1 in FIG. 2) includes a keycap 12, an up-down lift structure 14, a restoring member 18, and a backlit circuit board 10. For the backlit keyboard KB, the backlit module BL may include the backlit circuit board 10, a mask film 250, a light guide sheet 210, and a reflective layer 220. In other words, the backlit circuit board 10 can function as the baseplate of the keyswitch KS, the switch circuit board of the keyswitch KS, and the light source circuit board of the backlit module BL at the same time.

As shown in FIG. 2, the keycap 12 is disposed over the backlit circuit board 10 and has a light permeable region 122 (e.g. one or more light permeable characters) and a light impermeable region 124. The up-down lift structure 14 is connected between the backlit circuit board 10 and the keycap 12 and configured to support the up-down movement of the keycap 12 relative to the backlit circuit board 10. The backlit circuit board 10 is disposed under the keycap 10 and has a switch circuit 160. The switch circuit 160 is disposed on the upper surface of the backlit circuit board 10. The switch circuit 160 has switch pads 162 as a switch unit. When the keycap 12 is pressed, the switch pads 162 of the switch circuit 160 will be conducted to trigger the keyswitch signal. The restoring member 18 is disposed between the keycap 12 and the backlit circuit board 10 and configured to provide a restoring force to enable the keycap 12 to move upward relative to the backlit circuit board 10 to the non-pressed position when the pressing force is released. In this embodiment, the restoring member 18 can be embodied as an elastic member (e.g. rubber dome) and disposed corresponding to the switch pads 162. When the keycap 12 is pressed and moves downward to compress the restoring member 18, the triggering portion 182 of the restoring member 18 can trigger the switch pads 162, but not limited thereto, The switch pads 162 can be triggered by a triggering portion, which can be disposed on the restoring member 18, the up-down lift structure 14, or the keycap 12. According to practical applications, the restoring member 18 can be embodied as any suitable element, which can provide the restoring force to enable the keycap 12 to return the non-pressed position, such as spring, magnetic member. In this embodiment, the up-down lift structure 14 can be embodied as a scissors-like up-down lift structure, which has two frames pivotally coupled with each other, and two ends of each frame are movably coupled to the backlit circuit board 10 and the keycap 12, respectively, but not limited thereto. According to practical applications, the up-down lift structure 14 can be embodied as a butterfly up-down lift structure, a cantilever up-down lift structure, etc. The backlit circuit board 10, the keycap 12, the up-down lift structure 14, and the restoring member 18 constitute the keyswitch unit of the backlit keyswitch 1. Hereinafter, the backlit circuit board 10 of the invention and the backlit module BL including the backlit circuit board 10 will be described in detail.

Specifically, the backlit circuit board 10 is configured to support at least one keycap, such as keycap 12. The backlit circuit board 10 can include a substrate 110, a switch circuit 160, a lighting circuit 120, and an illuminant 130. The substrate 110 has a plurality of openings 113 and a plurality of coupling members 115. The plurality of openings 113 penetrate through the substrate 110 to allow light emitted from the illuminant 130 to pass therethrough to illuminate the keycap 12. For example, the substrate 110 has a plurality of ribs 117, which are configured to define the plurality of openings 113. The shape, amount, location of the ribs 117 and the openings 113 can be determined according to the structural strength of the backlit keyswitch 1, the location of the light permeable region 122 of the keycap 12, the power of the illuminant 130, etc. The plurality of coupling members 115 are disposed on the substrate 110 and configured to directly or indirectly connect the keycap 12. In this embodiment, the coupling member 115 can be a hook-shaped coupler, and the keycap 12 is coupled to the backlit circuit board 10 by coupling the up-down lift structure 14 with the coupling members 115, but not limited thereto. According to practical applications, the coupling member 115 can be in the form of a groove, a post, etc.

In an embodiment, the substrate 110 can include a metal plate 112 and at least one insulation layer, such as an upper insulation layer 114U and a lower insulation layer 114B. The at least one insulation layer at least partially covers an upper surface and a lower surface of the metal plate 112. For example, the lower insulation layer 114B is disposed on the lower surface of the metal plate 112, and a surface (e.g. lower surface) of the lower insulation layer 114B serves as the insulation surface 110*a*. The upper insulation layer 114U is disposed on the upper surface of the metal plate 112, and a surface (e.g. upper surface) of the upper insulation layer 114U serves as the insulation surface 110*b*. The metal plate 112 can be a conductive plate, such as an aluminum alloy plate or a steel plate, so that the metal plate 112 itself can shield radio waves and functions as a grounding component to reduce the electrostatic discharge (ESD) problem. The upper insulation layer 114U and the lower insulation layer 114B can be formed by any suitable methods, such as adhering, printing, coating, disposition, molding, to cover the upper surface and the lower surface of the metal plate 112, so that the insulation surfaces 110*a* and 110*b* will be formed on the lower surface and the upper surface of the substrate 110, respectively. For example, the upper insulation layer 114U can be disposed on the entire upper surface of the metal plate 112 or a partial upper surface of the metal plate 112 where the switch circuit 160 is to be arranged. The lower insulation layer 114B can be disposed on the entire lower surface of the metal plate 112 or a partial lower surface of the metal plate 112 where the lighting circuit 120 is to be arranged. In an embodiment (not shown), the insulation layer (e.g. the upper insulation layer 114U or the lower insulation layer 114B) can further cover the inner wall of the opening 113 (or other through holes), the sidewall of the metal plate 112, and/or the surface of the coupling member 115 to prevent the ESD problem caused by the exposure of the metal plate 112. Moreover, the upper insulation layer 114U and the lower insulation layer 114B can include any suitable insulative material, such as polymers, dielectrics, which can electrically isolate the metal plate 112 from conductive wirings (e.g. the switch circuit 160, the lighting circuit 120). When the substrate 110 adopts the metal plate 112, the coupling members 115 can be formed by the following methods, for example: (1) stamping the metal plate to form flat coupling members, and then bending the coupling members to stand on the metal plate, (2) using the insert-molding technique to form plastic coupling members on the metal plate, or (3) using the hot-melting technique to fix preformed plastic coupling members on the metal plate, but not limited thereto.

In another embodiment, the substrate 110 can be a non-metal plate, such as a non-conductive plate made of glass fiber, carbon fiber, artificial resin, or polymers, and the insulation surfaces 110*a* and 10*b* can be the lower surface and the upper surface of the non-metal plate, respectively. When the substrate 110 adopts the non-metal plate, the coupling members 115 can be formed by the following methods, for example: (1) using the mold injection technique to form the substrate 110 with the coupling members 115 at one time, (2) using the insert-molding technique to form plastic coupling members on the non-metal plate, (3) using the hot-melting technique to fix preformed plastic coupling members on the non-metal plate, (4) fixing a metal frame with the coupling members 115 on the non-metal plate, or (5) fixing a metal frame on the non-metal plate, and then using the hot-melting technique to fix preformed plastic coupling members on the metal frame, but not limited thereto.

Figure 3:
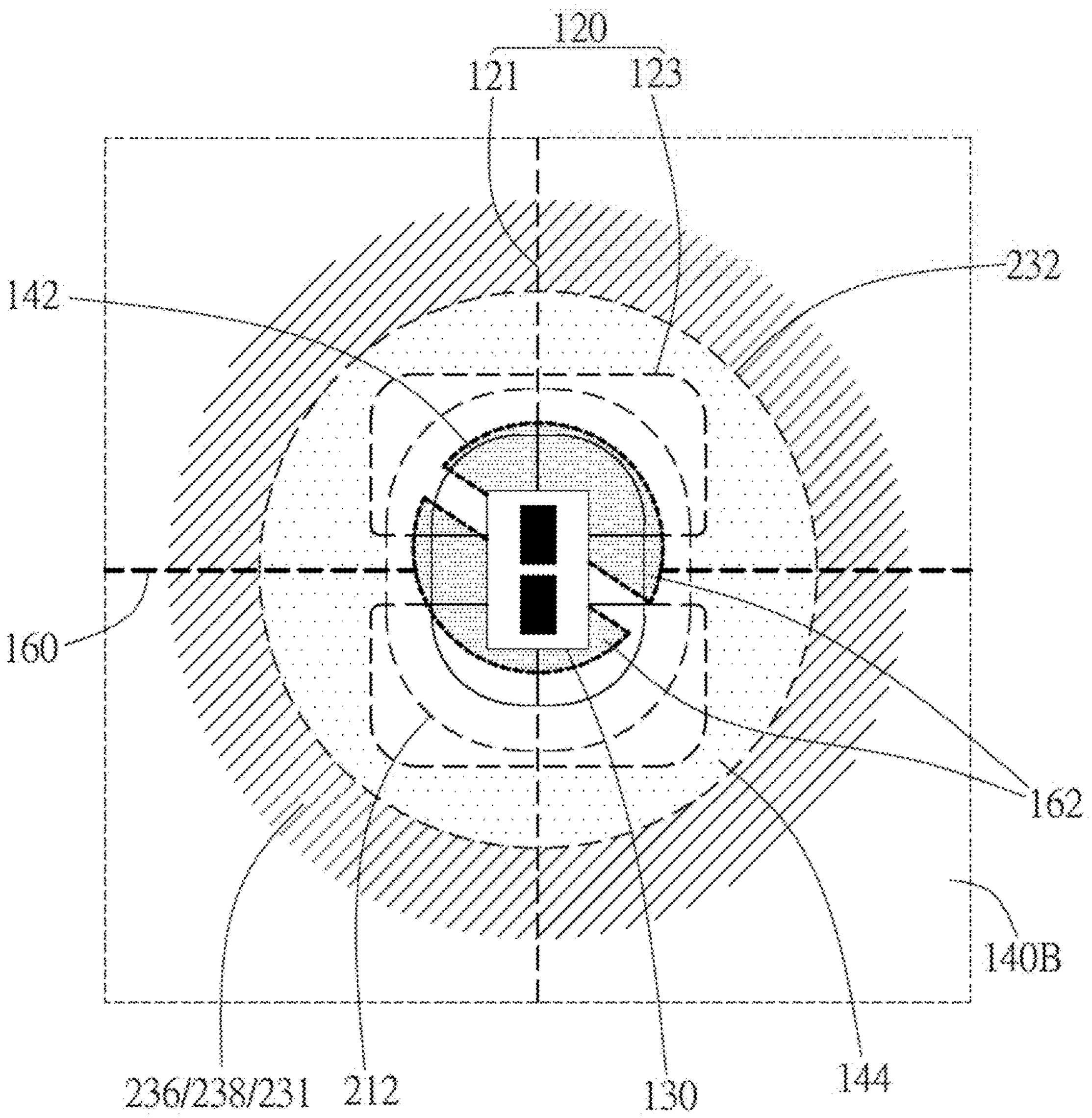
FIG. 3 is a schematic bottom view showing the lower surface of the backlit circuit board around the illuminant in an embodiment of the invention.

Referring to FIG. 2 and FIG. 3, FIG. 3 is a schematic bottom view showing the lower surface of the backlit circuit board around the illuminant in an embodiment of the invention. As shown in FIG. 2 and FIG. 3, the switch circuit 160 is disposed on the upper surface (e.g. the insulation surface 110*b*) of the substrate 110. The switch circuit 160 has the switch pads 162, and the switch pads 162 is configured to trigger the keyswitch signal in response to the keycap 12 moving toward the substrate 110. The switch circuit 160 (including the switch pads 162) can be formed on the upper surface of the substrate 110 by printing metal paste (e.g. silver paste) or etching a metal foil (e.g. copper foil), so that the backlit circuit board 10 integrates the switch circuit 160 to function as the baseplate and the switch circuit board of the keyswitch and the light source circuit board of the backlit module, thereby effectively achieving the thinning design of keyswitch. It is noted that when the switch circuit 160 is formed on the upper surface of the substrate 110, the switch pads 162 acting as the switch unit is preferably exposed to the triggering portion 182, and the triggering portion 182 preferably has a conductive part 182*a*. When the keycap 12 moves toward the backlit circuit board 10, the triggering portion 182 moves along with the keycap 12 to contact the switch pads 162 with the conductive part 182*a*, so that the switch pads 162 are conducted to trigger the keyswitch signal.

The lighting circuit 120 is disposed on the lower surface (e.g. the insulation surface 110*a*) of substrate 110 and located at a side opposite to the plurality of coupling members 115. Specifically, the coupling members 115 (and the switch circuit 160) and the lighting circuit 120 are located on the upper surface (i.e., the insulation surface 110*b*) and the lower surface (i.e., the insulation surface 110*a*) of the substrate 110, respectively. The lighting circuit 120 can be formed on the insulation surface 110*a* by printing metal paste (e.g. silver paste) or etching a metal foil (e.g. copper foil) to form a metal foil circuit. The lighting circuit 120 can include one or more main wirings 121 and one or more sub-wirings 123, which are configured to electrically connect the illuminant 130 with a driving component (not shown), so that the illuminant 130 can be driven to emit light.

The illuminant 130 is electrically connected to the lighting circuit 120 and configured to receive the power through the lighting circuit 120 for driving the illuminant 130 to emit light. For example, the illuminant 130 can be mounted on the lighting circuit 120 through a conductive adhesive to electrically connect the lighting circuit 120, but not limited thereto. In another embodiment, the illuminant 130 can be fixed on the insulation surface 110*a* through a non-conductive adhesive and then electrically connected to the lighting circuit 120 through other conductive wirings. The illuminant 130 can be embodied as a light-emitting diode (LED) of a single chip or multiple chips. In an embodiment, the illuminant 130 can be a side-lighting LED, which has a larger power and consumes high power, but can transmit light farther. Therefore, the backlit keyboard KB can be partially provided with several illuminants 130 to provide backlight to multiple keyswitches KS or even all keyswitches KS of the backlit keyboard KS, but not limited thereto. In another embodiment, the illuminant 130 can be a micro-LED (u LED), which can have a light-emitting pattern from five surfaces, such as a top surface and four side surfaces, and any keyswitch KS that requires backlight can be provided with a dedicated illuminant 130.

Moreover, the backlit module BL can optionally include at least one protective layer, such as an upper protective layer 140U and a lower protective layer 140B. The at least one protective layer is disposed on the substrate 110 and covers the switch circuit 160 and/or the lighting circuit 120. For example, the upper protective layer 140U is disposed on the insulation surface 110*b* and preferably covers the switch circuit 160 except the switch pads 162. The lower protective layer 140B is disposed on the insulation surface 110*a* and preferably covers the lighting circuit 120. As such, the at least one protective layer provides the switch circuit 160 and/or the lighting circuit 120 with waterproof and insulating effects. In an embodiment, the upper protective layer 140U is preferably formed by light-absorbing materials, such as black paint or black ink, and the lower protective layer 140B is preferably formed by reflective materials, such as white paint or white ink, but not limited thereto. According to practical applications, the upper protective layer 140U and the lower protective layer 140B can be formed by the same or different materials, for example, both being formed by reflective materials. In an embodiment, the lower protective layer 140B preferably has a reflective surface 146 and/or one or more microstructures 144. The lower protective layer 140B is preferably made of reflective insulation material, so that the lower surface (a surface that is far away from the insulation surface 110*a*) of the lower protective layer 140B can serve as the reflective surface 146. In an embodiment, the lower protective layer 140B can be formed, for example, by printing a white paint or white ink on the insulation surface 110*a* of the substrate 110. The lower protective layer 140B preferably covers all the insulation surface 110*a* and the lighting circuit 120, except where the illuminant 130 is located, to have a larger reflective surface 146, thereby facilitating the recycle of light to the light guide sheet 210. From another aspect, the lower protective layer 140B can be an insulative reflective film with a hole 142 (shown in FIG. 3) corresponding to the illuminant 130, so that the illuminant 130 can protrude from the hole 142 toward the light guide sheet 210. Moreover, the lower protective layer 140B (or the upper protective layer 140U) may have one or more through holes 148B (or 148U) at locations corresponding to the openings 113 of the substrate 110 to allow light to emit out of the openings 113 though the though holes 148B (or 148U), but not limited thereto. According to practical applications, when the lower protective layer 140B (or the upper protective layer 140U) is formed by a light permeable film, the protective layer (e.g. 140B, 140U) may not have such through holes. The reflective surface 146 of the lower protective layer 140B can be formed by disposing the reflective material or coating on the lower surface of the lower protective layer 140B. The upper protective layer 140U can have light-absorbing or reflective capability by, for example, providing light-absorbing materials or reflective materials on the surface other than the openings 113. In an embodiment, the reflective surface 146 is preferably disposed not corresponding to the openings 113 of the substrate 110. Specifically, in the stacking direction, the vertical projection of the openings 113 at least partially does not overlap the reflective surface 146, so that light can emit out of the openings 113 of the substrate 110 through the lower protective layer 140B (or the through holes 148B). In an embodiment, the microstructures 144 of the lower protective layer 140B preferably correspond to at least one of the plurality of ribs 117 of the substrate 110, so that the microstructures 144 and the at least one rib 117 at least partially overlap with each other in the stacking direction. From another aspect, the microstructures 144 of the lower protective layer 140B preferably correspond to the light impermeable region 124 of the keycap 12, so that the microstructures 144 and the light impermeable region 124 of the keycap 12 at least partially overlap with each other in the stacking direction. The microstructures 144 preferably direct light toward the light guide sheet 210 by reflection, scattering, or diffusion to enhance the recycle of light and the propagation in the transverse direction.

The light guide sheet 210 is disposed below the lower protective layer 140B, and light emitted from the illuminant 130 can enter the light guide sheet 210 to propagate in the transverse direction to illuminate the keycap 12. Specifically, the light guide sheet 210 has a light hole 212, and the illuminant 130 is accommodated in the light hole 212. The light guide sheet 210 can be a film-like or sheet-like plate, which can be made of any suitable optical materials, such as optical polymers. The light hole 212 is a through hole penetrating through the light guide sheet 210 in the thickness direction, so that the illuminant 130 can extend from the hole 142 of the lower protective layer 140B into the light hole 212. The light guide sheet 210 can further have a plurality of light-exit portions 214 configured to destroy the total reflection of light to emit light upward. The plurality of light-exit portions 214 are preferably disposed corresponding to the openings 113, but not limited thereto. The light-exit portions 214 can be disposed at any positions for light output as appropriate. The light-exit portion 214 can be any suitable optical microstructure, so when the light encounters the light-exit portion 214, the light will scatter upward out of the light guide sheet 210.

The backlit module BL can optionally include a mask film 250. The mask film 250 is disposed between the lower protective layer 140B and the light guide sheet 210. The mask film 250 has at least one light-permeable window 252 corresponding to at least one keycap 12. Specifically, the mask film 250 can be a light permeable film (such as polyethylene terephthalate (PET) film) with a light-blocking coating 254 formed by light-blocking materials (coating materials) thereon to define a plurality of light-permeable windows 252. The light-blocking coating 254 can have a one layer structure or a multiple-layer structure and is configured to reflect or absorb light, so that most of light can emit to the openings 113 of the backlit circuit board 10 from the light-permeable windows 252. For example, the light-blocking material can include white paint (white ink) and/or black paint (black ink), but not limited thereto. According to practical applications, the light-blocking coating 254 can be disposed on the upper surface and/or the lower surface of the mask film 250. The light-blocking material can be any suitable optical materials, and the light-blocking coating 254 can be formed by any suitable manner (e.g. printing), so that the mask film 250 has a light-blocking portion (e.g. 254) and a light-permeable portion (e.g. 252) to achieve the effect of partially blocking light and partially allowing light to pass therethrough. In this embodiment, the mask film 250 can have an illuminant hole 256. The illuminant hole 256 is disposed corresponding to the illuminant 130, so that the illuminant 130 can extend through the illuminant hole 256 into the light hole 212 of the light guide sheet 210. In an embodiment, the light-permeable windows 252 of the mask film 250 are preferably disposed corresponding to the keycaps 12 in an one-to-one manner, and the light-permeable window 252 preferably retreats inside the profile of the corresponding keycap 12 to enhance the uniformity of edge halo of the keycaps 12, but not limited thereto.

In another embodiment, the mask film 250 can be integrated with the lower protective layer 140B, so that the mask film 250 not only has the effect of partially blocking light and partially allowing light to pass therethrough, but also functions as the protective layer for protecting the lighting circuit 120, and the lower protective layer 140B can be omitted to further reduce the overall thickness of keyswitch. From another aspect, the lower protective layer 140B can be integrated with the mask film 250, so that the lower protective layer 140B not only protects the lighting circuit 120, but also has the effect of partially blocking light and partially allowing light to pass therethrough to function as the mask film, and the mask film 250 can be omitted to further reduce the overall thickness of keyswitch.

The backlit module BL can optionally include a reflective layer 220. The reflective layer 220 is disposed at one side of the light guide sheet 210 opposite to the mask film 250 (e.g. the lower side). The reflective layer 220 is configured to reflect light that leaks from the bottom surface of the light guide sheet 210 back to the light guide sheet 210. Specifically, the reflective layer 220 can be a reflective film made of reflective materials (e.g. metal foil), a layer of reflective material coated on a non-reflective film, or a plastic film doped with reflective particles (e.g. PET film doped with reflective particles), but not limited thereto. In an embodiment, the reflective layer 220 can be a reflective sheet disposed on the lower surface of the light guide sheet 210, but not limited thereto. The reflective layer 220 can be provided with a microstructure 222, which is configured to direct light upward. For example, the microstructure 222 of the reflective layer 220 can be disposed corresponding to the light hole 212 of the light guide sheet 210 to effectively reflect light emitted from the illuminant 130 into the light guide sheet 210 from the sidewall of the light hole 212, but not limited thereto. The microstructure 222 can be disposed at any suitable location of the reflective layer 220 to increase the amount of light output and the recycle of light.

The backlit module BL can further include at least one glue layer (e.g. 236, 238, 231), which is configured to adhere the lower protective layer 140B, the mask film 250, the light guide sheet 210, and the reflective layer 220. Specifically, the mask film 250 and the lower protective layer 140B are adhered by a glue layer 236. For example, the glue layer 236 is disposed around the illuminant 130 and located between the mask film 250 and the lower protective layer 140B, and a glue-free region 236' is preferably formed between the illuminant hole 256 and the glue layer 236. The glue layer 236 is disposed on the top surface of the mask film 250 and located around the illuminant hole 256, so that the mask film 250 and the illuminant 130 can be positioned by the glue layer 236 to enhance the optical coupling stability. The glue layer 236 is spaced apart from the edge of the illuminant hole 256 of the mask film 250 to form the glue-free region 236' therebetween, i.e., the region around the illuminant hole 256 without the glue layer 236. As such, the glue layer 236 can be prevented from entering the illuminant hole 256 to interfere with light output.

The mask film 250 and the light guide sheet 210 are adhered by a glue layer 238. For example, the glue layer 238 is disposed around the illuminant 130 and located between the mask film 250 and the light guide sheet 210, and a glue-free region 238' is preferably formed between the illuminant hole 256 and the glue layer 238. The glue layer 238 is disposed on the bottom surface of the mask film 250 and located around the illuminant hole 256, so that the mask film 250, the light guide sheet 210, and the illuminant 130 can be positioned by the glue layer 238 to enhance the optical coupling stability. The glue layer 238 is spaced apart from the edge of the illuminant hole 256 of the mask film 250 to form the glue-free region 238' therebetween, i.e., the region around the illuminant hole 256 without the glue layer 238. As such, the glue layer 238 can be prevented from entering the illuminant hole 256 to interfere with light output.

The light guide sheet 210 and the reflective layer 220 are adhered by a glue layer 231. For example, the glue layer 231 is disposed around the illuminant 130 and located between the light guide sheet 210 and the reflective layer 220, and a glue-free region 233 is preferably formed between the light hole 212 and the glue layer 231. The glue layer 231 is disposed on the bottom surface of the light guide sheet 210 and located around the light hole 212, so that the light guide sheet 210, the reflective layer 220, and the illuminant 130 can be positioned by the glue layer 231 to enhance the optical coupling stability. The glue layer 231 is spaced apart from the edge of the light hole 212 of the light guide sheet 210 to form the glue-free region 233 therebetween, i.e., the region around the light hole 212 without the glue layer 231. As such, the glue layer 231 can be prevented from entering the light hole 212 to interfere with light output.

Moreover, the glue layer 236, 238, or 231 can be formed by optical materials, which are light permeable and have a refractive index closer to that of the light guide sheet 210 than the air. As such, the reflected light can enter the light guide sheet 210 at a relatively higher proportion and then propagates in the light guide sheet 210 by total reflection. The vertical projection of the plurality of light-exit regions 214 on the backlit circuit board 10 preferably does not overlap the ribs 117. In this embodiment, the plurality of light-exit regions 214 are preferably disposed outside the glue-free region 236', 238', 233 defined by the glue layer 236, 238, 231 to increase the proportion of light traveling along the transverse (horizontal) direction. From another aspect, the glue-free region 236', 238', 233 can be located between the mask film 250 and the backlit circuit board 10, between the upper surface of the light guide sheet 210 and the mask film 250, between the lower surface of the light guide sheet 210 and the reflective layer 220. The vertical projections of the glue-free regions 236', 238', and 233 can at least partially overlap or even completely overlap with each other.

As shown in FIG. 2 and FIG. 3, the hole 142 of the lower protective layer 140B is preferably smaller than the light hole 212 of the light guide sheet 210, but not limited thereto. Moreover, in the area corresponding to the glue-free region 236', 238', or 233, the microstructure 144 of the lower protective layer 140B preferably corresponds to the microstructure 222 of the reflective layer 220, so that the microstructure 144 and the microstructure 222 at least partially overlap with each other in the stacking direction. From another aspect, the microstructure 222 of the reflective layer 220 is preferably disposed within the vertical projection of the light hole 212 of the light guide sheet 210 to direct light emitted from the illuminant 130 into the light guide sheet 210 from the sidewall of the light hole 212. The switch circuit 160 and the lighting circuit 120 are disposed at two opposite sides of the substrate 110 (e.g. upper side and lower side), respectively, and the vertical projection of the switch pads 162 overlaps the illuminant 130. Specifically, the switch circuit 160 and the lighting circuit 120 are disposed on the upper side and the lower side (such as the upper surface and the lower surface) of at least one of the plurality of ribs 117, respectively. The vertical projections of the switch pads 162 and the illuminant 130 fall within the range surrounded by the plurality of the coupling members 115 or even within the glue-free region 236', 238', or 233.

Figure 4:
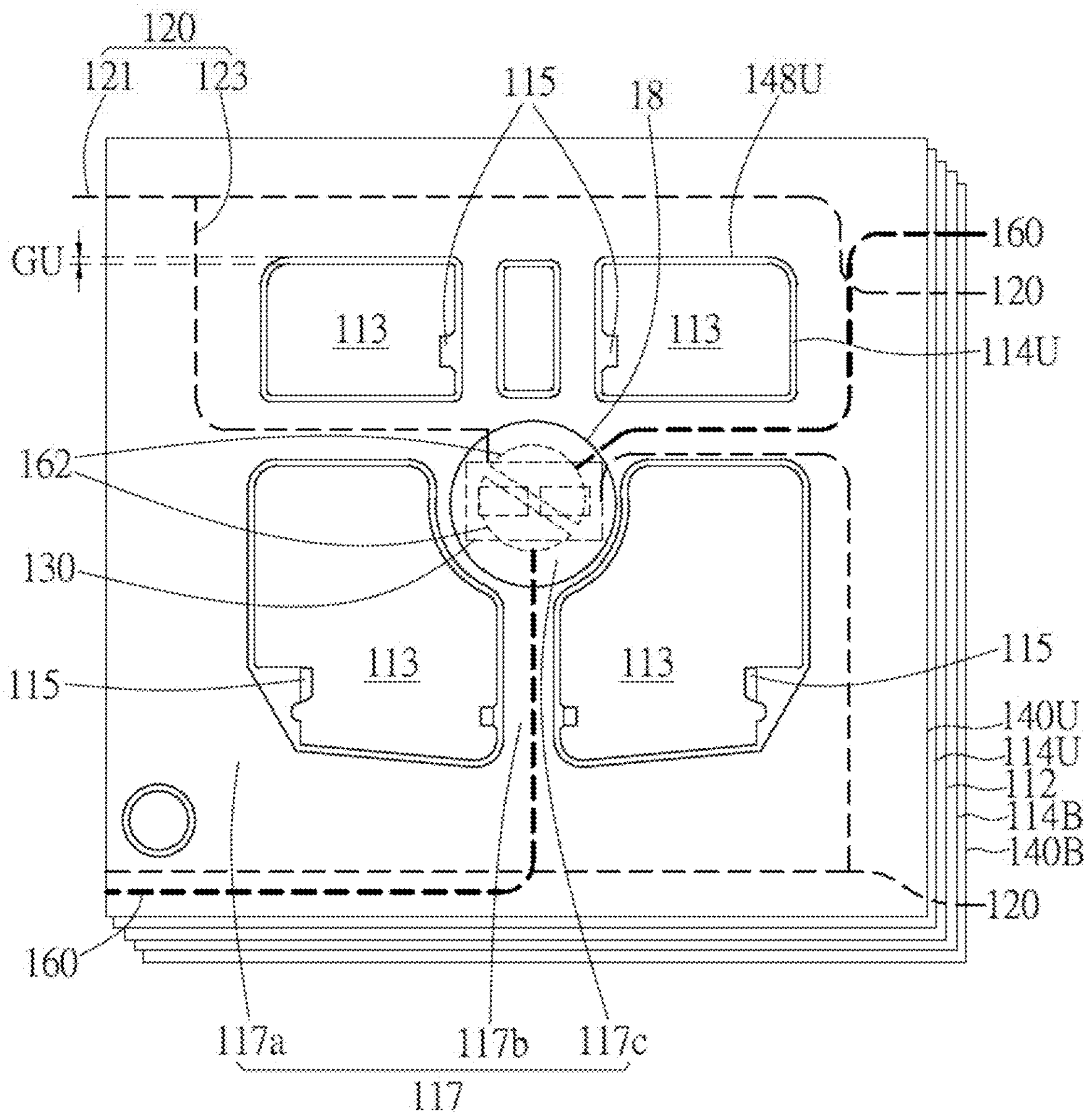
FIG. 4 is a schematic top view of the backlit circuit board corresponding to a single keyswitch in an embodiment of the invention.
Figure 5:
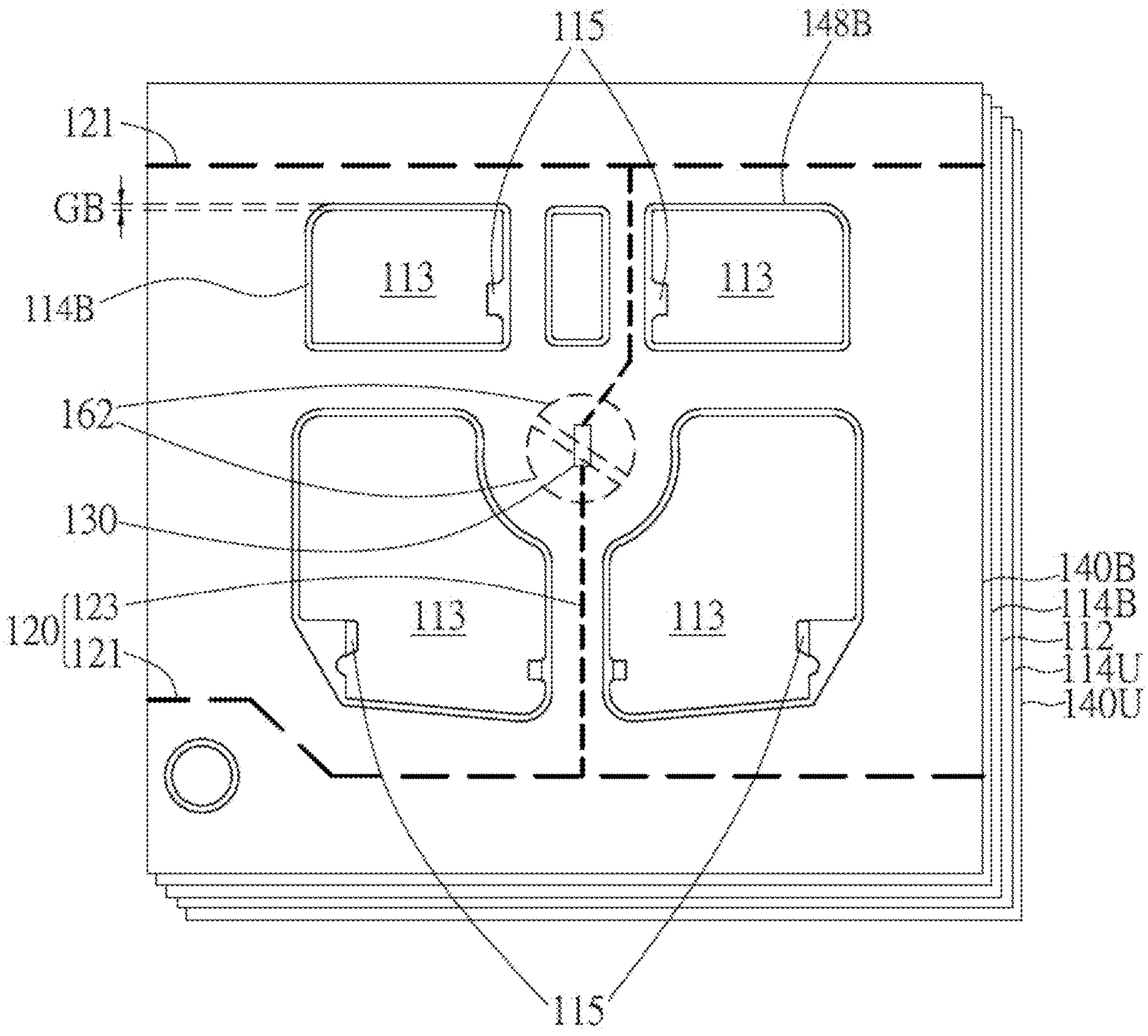
FIG. 5 is a schematic bottom view of the backlit circuit board corresponding to a single keyswitch in an embodiment of the invention.

Referring to FIG. 4 and FIG. 5, FIG. 4 is a schematic top view of the backlit circuit board corresponding to a single keyswitch in an embodiment of the invention, and FIG. 5 is a schematic bottom view of the backlit circuit board corresponding to a single keyswitch in an embodiment of the invention. As shown in FIG. 4 and FIG. 5, the lighting circuit 120 may include main wirings 121 and sub-wirings 123, and the lighting circuit 120 is distributed on the insulation surface 110*a* (e.g. lower surface) of the substrate 110 and at least partially overlaps the ribs 117. For example, the lighting circuit 120 can be distributed on the lower surface of the frame rib 117*a*, the bridge rib 117*b*, the central island rib 117*c*. In order to avoid the switch circuit 160 appearing on the openings 113 of the substrate 110 to block the light, the switch circuit 160 is preferably disposed within the upper vertical projection of the ribs 117 of the substrate 110. For example, the switch circuit 160 can be distributed on the upper surface of the frame rib 117*a*, the bridge rib 117*b*, the central island rib 117*c*. With such a configuration, the switch circuit 160 may have a switch circuit section, which overlaps the lighting circuit section of the lighting circuit 120. The switch circuit section and the lighting circuit section can be respectively arranged on the upper and lower vertical projections of the same frame rib 117*a*, bridge rib 117*b*, or central island rib 117*c* and partially parallel to each other. The switch pads 162 and the illuminant 130 are preferably disposed on the upper side and the lower side of the central island rib 117*c*, so that the vertical projection of the switch pads 162 at least partially overlaps the illuminant 130. Moreover, as shown in FIG. 4, a gap GU is formed between the upper protective layer 140U and the edge of the opening 113, so that the through hole 148U of the upper protective layer 140U is larger than the opening 113 of the substrate 110. As shown in FIG. 5, a gap GB is formed between the lower protective layer 140B and the edge of the opening 113, so that the through hole 148B of the lower protective layer 140B is larger than the opening 113 of the substrate 110, but not limited thereto. According to practical applications, the through hole 148U (or 148B) of the upper protective layer 140U (or the lower protective layer 140B) can be smaller than or equal to the opening 113. For example, the upper protective layer 140U (or the lower protective layer 140B) can extend to the vertical surface of the inner wall (sidewall) of the opening 113 of the substrate 110.

Figure 6A:
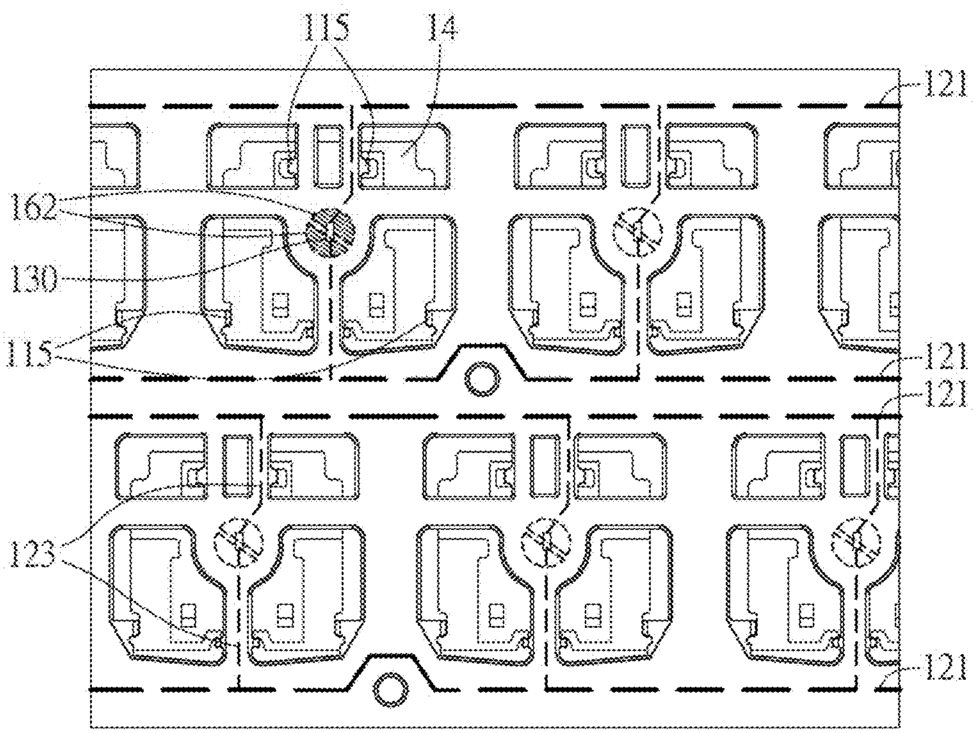
FIG. 6A is a schematic bottom view showing the configuration of the backlit circuit board and the up-down lift structures corresponding to multiple keyswitches in an embodiment of the invention.
Figure 6B:
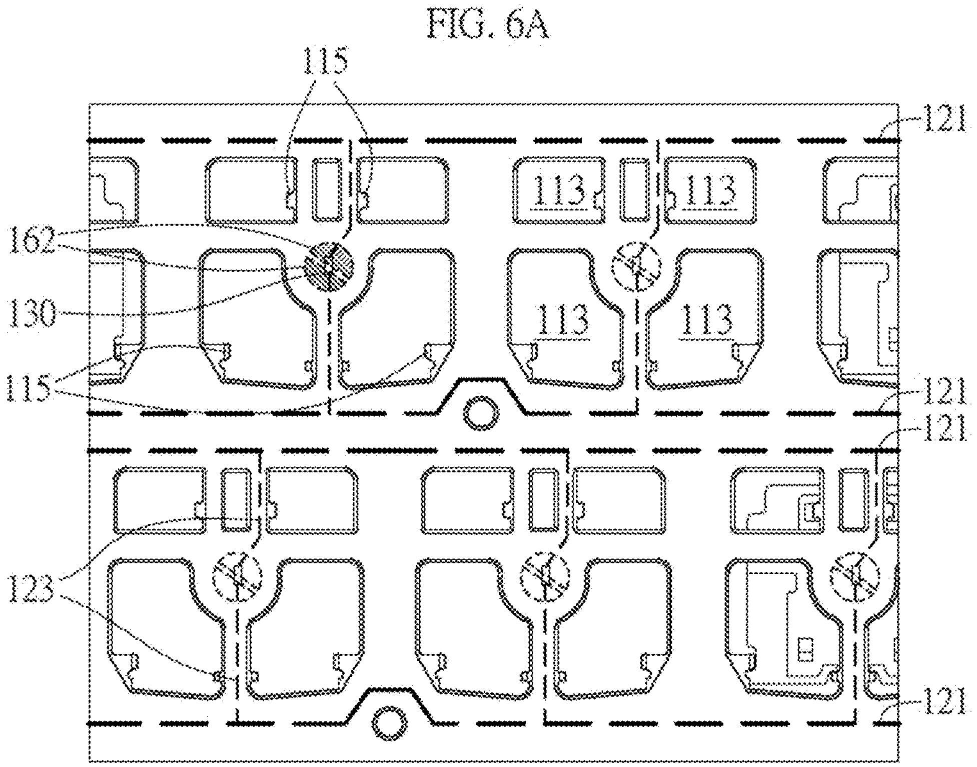
FIG. 6B is a schematic bottom view of the backlit circuit board of FIG. 6B without the up-down lift structures.

FIG. 6A is a schematic bottom view showing the configuration of the backlit circuit board and the up-down lift structures corresponding to multiple keyswitches in an embodiment of the invention. FIG. 6B is a schematic bottom view of the backlit circuit board of FIG. 6B without the up-down lift structures. As shown in FIG. 6A and FIG. 6B, the lighting circuit 120 includes a plurality of main wirings 121 and a plurality of sub-wirings 123. The plurality of main wirings 121 preferably extend in parallel along the arranging direction of the keyswitches. The plurality of sub-wirings 123 extend from corresponding main wirings 121 toward the illuminants 130 to electrically connect the corresponding illuminant 130. In each keyswitch, the up-down lift structure 14 is coupled to the coupling members 115, and the vertical projection of the up-down lift structure 14 preferably falls within the range surrounded by the openings 113.

Figure 7:
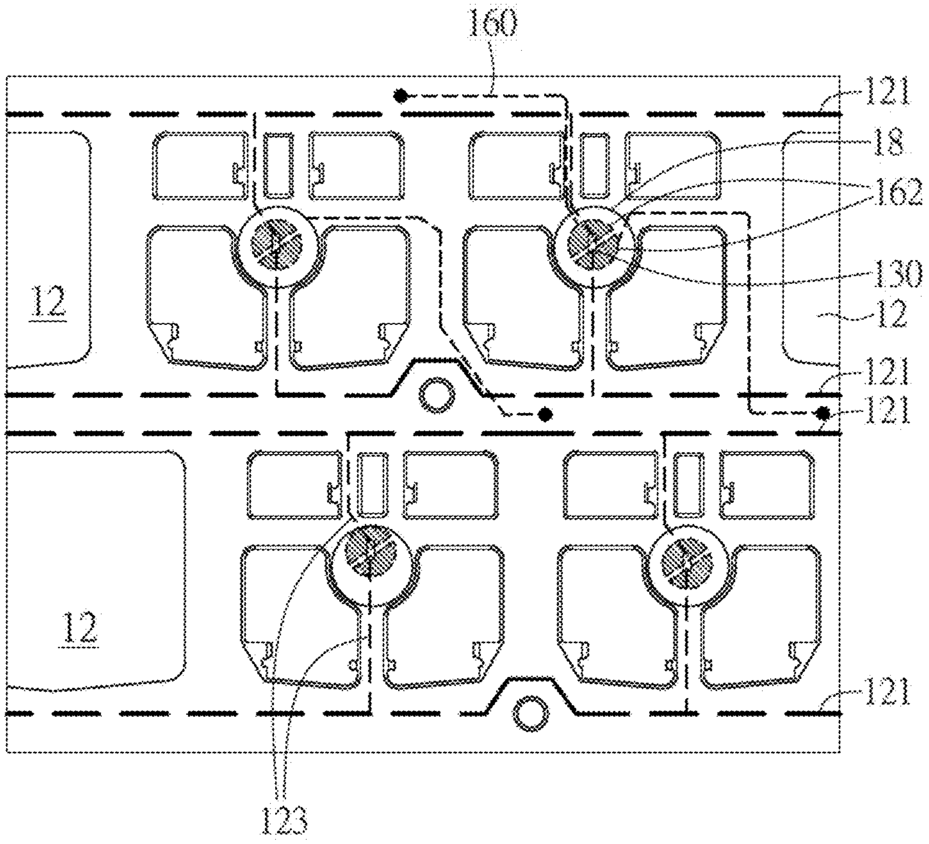
FIG. 7 is a schematic top view of the backlit circuit board corresponding to multiple keyswitches in an embodiment of the invention.

FIG. 7 is a schematic top view of the backlit circuit board corresponding to multiple keyswitches in an embodiment of the invention. As shown in FIG. 7, the switch circuit 160 is disposed along the surface of the substrate 110, and the switch pads 162 are located at the central island rib (e.g. 117*c*). The switch pads 162 are preferably located within the vertical projection of the restoring member 18, such as covered by the rubber dome, to correspond to the triggering portion 182 (shown in FIG. 2) of the restoring member 18. From another aspect, the vertical projection of the switch pads 162 overlaps the illuminant 130, so that the illuminant 130 may fall within the vertical projection of the restoring member 18. The plurality of openings 113 preferably fall within the vertical projection of the keycap 12 to enhance the outer appearance of the keyswitch or keyboard.

Although the preferred embodiments of the invention have been described herein, the above description is merely illustrative. The preferred embodiments disclosed will not limit the scope of the invention. Further modification of the invention herein disclosed will occur to those skilled in the respective arts and all such modifications are deemed to be within the scope of the invention as defined by the appended claims.

What is claimed is:

1. A lighting board for supporting a keycap, comprising:
- a substrate having a plurality of openings penetrating through the substrate, and a plurality of coupling members disposed on the substrate and configured to directly or indirectly connect the keycap;
- a switch circuit disposed on the substrate, the switch circuit having switch pads for triggering a keyswitch signal in response to the keycap moving toward the substrate;
- a lighting circuit disposed on the insulation surface and located at a side of the substrate opposite to the plurality of coupling members; and
- an illuminant electrically connected to the lighting circuit,
- wherein vertical projections of the switch pads and the illuminant fall within an area surrounded by the plurality of coupling members.

2. The backlit circuit board of claim 1, wherein the substrate is a non-metal plate, and an upper surface and a lower surface of the substrate are insulation surfaces.

3. The backlit circuit board of claim 1, wherein the substrate comprises a metal plate and at least one insulation layer; the at least one insulation layer at least partially covers an upper surface and a lower surface of the metal plate.

4. The backlit circuit board of claim 3, wherein the at least one insulation layer further covers an inner wall of at least one of the plurality of openings, a sidewall of the metal plate, and/or a surface of at least one of the plurality of coupling members.

5. The backlit circuit board of claim 1, wherein the vertical projection of the switch pads overlaps the illuminant.

6. The backlit circuit board of claim 1, wherein a vertical projection of the switch circuit at least partially overlaps the lighting circuit.

7. The backlit circuit board of claim 1, further comprising at least one protective layer disposed on the substrate to cover the switch circuit and/or the lighting circuit.

8. The backlit circuit board of claim 7, wherein the substrate has a plurality of ribs configured to define the plurality of openings; the at least one protective layer has a reflective surface and/or a microstructure; the microstructure overlaps at least one of the plurality of ribs of the substrate.

9. The backlit circuit board of claim 7, wherein the keycap has a light permeable region and a light impermeable region; the at least one protective layer has a reflective surface and/or a microstructure; the microstructure overlaps the light impermeable region of the keycap.

10. The backlit circuit board of claim 1, wherein the substrate has a plurality of ribs configured to define the plurality of openings; the switch circuit and the lighting circuit are disposed above and below at least one of the plurality of ribs, respectively.

11. A backlit module, comprising:
- the backlit circuit board of claim 1; and
- a light guide sheet, wherein light emitted from the illuminant enters the light guide sheet to propagate transversely to illuminate the keycap.

12. The backlit module of claim 11, wherein the light guide sheet has a light hole; the illuminant is accommodated in the light hole.

13. The backlit module of claim 11, further comprising a glue layer disposed around the illuminant and located between the light guide sheet and the substrate, wherein a glue-free region is formed between the light hole and the glue layer.

14. The backlit module of claim 11, further comprising a reflective layer disposed at a side of the light guide sheet opposite to the substrate.

15. The backlit module of claim 12, further comprising a reflective layer disposed at a side of the light guide sheet opposite to the substrate, wherein the reflective layer has a microstructure located within a vertical projection of the light hole of the light guide sheet.

16. The backlit module of claim 11, further comprising a mask film disposed between the substrate and the light guide sheet, wherein the mask film has at least one light-permeable window corresponding to the keycap.

17. The backlit module of claim 16, wherein the mask film has an illuminant hole; the light guide sheet has a light hole corresponding to the illuminant hole; the illuminant extends through the illuminant hole into the light hole.

18. A backlit keyswitch, comprising:

the backlit circuit board of claim 1; and the keycap.

* * * * *